(12) United States Patent
Luo et al.

(10) Patent No.: US 11,483,115 B2
(45) Date of Patent: Oct. 25, 2022

(54) CSI-RS SENDING METHOD AND DEVICE, AND BASE STATION

(71) Applicant: Huawei Technologies Co., Ltd., Shenzhen (CN)

(72) Inventors: Yajun Luo, Chengdu (CN); Xun Li, Shanghai (CN); Chaofeng Wei, Xi'an (CN); Zhen Huangfu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 17/127,486

(22) Filed: Dec. 18, 2020

(65) Prior Publication Data

US 2021/0105123 A1 Apr. 8, 2021

Related U.S. Application Data

(63) Continuation of application No. PCT/CN2018/092019, filed on Jun. 20, 2018.

(51) Int. Cl.
*H04L 5/00* (2006.01)
*H04B 7/06* (2006.01)
*H04W 24/10* (2009.01)

(52) U.S. Cl.
CPC ......... *H04L 5/0048* (2013.01); *H04B 7/0626* (2013.01); *H04L 5/0023* (2013.01); *H04L 5/0057* (2013.01); *H04W 24/10* (2013.01)

(58) Field of Classification Search
CPC ...... H04B 7/0456; H04B 7/06; H04B 7/0626; H04L 5/0023; H04L 5/0048;
(Continued)

(56) References Cited

U.S. PATENT DOCUMENTS

2013/0142125 A1 6/2013 Shimezawa et al.
2013/0286960 A1 10/2013 Li et al.
(Continued)

FOREIGN PATENT DOCUMENTS

CN 101924610 A 12/2010
CN 103703712 A 4/2014
(Continued)

OTHER PUBLICATIONS

"CSI-RS design for beam management," 3GPP TSG RAN WG1 NR Ad-Hoc Meeting, Spokane, USA, R1-1700069, total 7 pages, 3rd Generation Partnership Project, Valbonne, France (Jan. 16-20, 2017).
(Continued)

*Primary Examiner* — Benjamin H Elliott, IV
*Assistant Examiner* — Prince A Mensah
(74) *Attorney, Agent, or Firm* — Leydig, Voit & Mayer, Ltd.

(57) ABSTRACT

Embodiments provide a CSI-RS sending method and device, and a base station. The CSI-RS sending method includes: receiving capability indication information of each user equipment UE in a cell; determining N transmission schemes based on the capability indication information; configuring CSI-RS resources to be multiplexed by CSI-RSs corresponding to the N transmission schemes; and sending, to corresponding UE based on each of the N transmission schemes, a CSI-RS that is carried on the CSI-RS resource and that corresponds to the corresponding transmission scheme. It can be learned that according to the technical solutions in the embodiments of this application, when resources are limited, CSI-RSs corresponding to different transmission schemes are sent in a resource multiplexing manner, so that a plurality of transmission schemes can be compatible, and resource utilization can be improved.

14 Claims, 6 Drawing Sheets

(58) Field of Classification Search
CPC .... H04L 5/0053; H04L 5/0057; H04W 24/00; H04W 24/08; H04W 24/10
See application file for complete search history.

(56) References Cited

U.S. PATENT DOCUMENTS

| | | | |
|---|---|---|---|
| 2015/0049830 | A1 | 2/2015 | Hu et al. |
| 2017/0332359 | A1 | 11/2017 | Tsai et al. |
| 2018/0084539 | A1 | 3/2018 | Kubota et al. |
| 2018/0375561 | A1* | 12/2018 | Park .................. H04B 7/0456 |
| 2019/0260428 | A1* | 8/2019 | Hugl .................. H04L 5/0053 |

FOREIGN PATENT DOCUMENTS

| | | |
|---|---|---|
| CN | 107466451 A | 12/2017 |
| CN | 108183784 A | 6/2018 |
| EP | 2817895 A1 | 12/2014 |
| WO | 2011103309 A2 | 8/2011 |
| WO | 2013125913 A1 | 8/2013 |
| WO | 2017193973 A1 | 11/2017 |
| WO | 2018058456 A1 | 4/2018 |
| WO | 2018079691 A1 | 5/2018 |

OTHER PUBLICATIONS

"CSI-RS design for NR," 3GPP TSG RAN WG1 NR-Adhoc, Spokane, USA, R1-1700551, total 3 pages, 3rd Generation Partnership Project, Valbonne, France (Jan. 16-20, 2017).

"On CSI-RS for beam management," 3GPP TSG RAN WG1 Meeting #89, Hangzhou, P.R. China, R1-1707128, Total 8 pages, 3rd Generation Partnership Project, Valbonne, France (May 15-19, 2017).

"Consideration on CSI-RS configuration," 3GPP TSG-RAN WG2 Meeting #73, Taipei, R2-111555/R1-111156, Total 5 pages, 3rd Generation Partnership Project, Valbonne, France (Feb. 21-25, 2011).

* cited by examiner

CSI-RS SENDING METHOD AND DEVICE, AND BASE STATION

CROSS-REFERENCE TO RELATED APPLICATIONS

This application is a continuation of International Application No. PCT/CN2018/092019, filed on Jun. 20, 2018, the disclosure of which is hereby incorporated by reference in its entirety.

TECHNICAL FIELD

Embodiments of this application relate to the field of communications technologies, and in particular, to a channel state information-reference signal (CSI-RS) sending method and device, and a base station.

BACKGROUND

A long term evolution (LTE) system and a 5th generation mobile communications technology (5G) system support a communications technology in which a base station uses a plurality of antennas to transmit signals on a same time-frequency resource, and user equipment (UE) receives the signals on a plurality of antennas. The technology is a massive multiple input multiple output (Massive MIMO) technology. Based on this, each antenna port of the base station corresponds to one reference signal (RS), and occupies one specific resource element (RE) in the time-frequency resource. Antenna ports supported by a cell served by the base station when the cell is in different states are determined by the base station through reference signal configuration. For example, when a channel state is measured in the cell, the base station configures a CSI-RS resource.

In addition, a plurality of downlink transmission modes (TMs) are defined in an LTE protocol. The downlink transmission modes each correspond to a transmission protocol, and are applicable to transmission of different downlink reference signals. For example, TM9 is applicable to transmission of a CSI-RS. Further, a plurality of transmission schemes are further set for TM9 based on different capabilities of UEs. Different transmission schemes are applicable to UEs of different capability types, and quantities of antenna ports configured for the different transmission schemes are different. Therefore, quantities of occupied REs are also different. For example, for an R14 class A scheme supporting a TM9 protocol, 32 antenna ports are configured, to be specific, for the R14 class A scheme, 32 RE resources of CSI-RSs need to be configured on each resource block (RB). For an R10 scheme supporting the TM9 protocol, for example, if four beams need to be configured, and each beam corresponds to four CSI-RSs, 4*4=16 RE resources of CSI-RSs need to be configured for the R10 scheme in this scenario.

Usually, when TM9 is used to send a downlink reference signal, the protocol specifies that a maximum of 40 REs can be configured on one RB for sending CSI-RSs. However, a cell includes UEs of a plurality of capability types. As a result, when the base station uses TM9 to send CSI-RSs, at least two transmission schemes may need to be supported to be compatible with UEs with different capabilities. Because it is very likely that more than 40 REs need to be occupied to support the at least two transmission schemes, RE resources required by the CSI-RSs are insufficient. Consequently, when TM9 is used to send the CSI-RSs, different transmission schemes are incompatible.

SUMMARY

Embodiments of this application provide a CSI-RS sending method and device, and a base station, to resolve a problem that different transmission schemes are incompatible due to limited configuration resources.

According to a first aspect, an embodiment of this application provides a CSI-RS sending method. The method includes:

receiving capability indication information of each user equipment UE in a cell;

determining N transmission schemes based on the capability indication information, where N is greater than or equal to 2, and a total quantity of CSI-RSs corresponding to the N transmission schemes is greater than 40;

configuring CSI-RS resources to be multiplexed by the CSI-RSs corresponding to the N transmission schemes, where the CSI-RS resources are radio sending resources carrying the CSI-RSs corresponding to the N transmission schemes; and sending, to corresponding UE based on each of the N transmission schemes, a CSI-RS that is carried on the CSI-RS resource and that corresponds to the corresponding transmission scheme.

In this embodiment, CSI-RSs corresponding to different transmission schemes are sent in a resource multiplexing manner, so that a plurality of transmission schemes can be compatible, and resource utilization can be improved.

In another embodiment, the configuring CSI-RS resources to be multiplexed by the CSI-RSs corresponding to the N transmission schemes includes:

configuring a time domain resource to be occupied by the CSI-RS corresponding to each of the N transmission schemes, so that the time domain resource occupied by the CSI-RS corresponding to each transmission scheme is different from a time domain resource occupied by a CSI-RS corresponding to another transmission scheme; and/or configuring resource blocks RBs to be used, in a staggered manner, by the CSI-RSs corresponding to the N transmission schemes, where a total quantity of resource elements REs occupied on each used RB is less than or equal to 40; and/or configuring a code resource for each of the N transmission schemes, so that CSI-RSs that occupy a same RE but correspond to different transmission schemes are encoded based on different code resources.

A total quantity of CSI-RSs for which REs need to be configured is greater than 40, if one RE is configured for each CSI-RS on one RB, a protocol specification is not complied with. Therefore, in this embodiment, through configuration of the CSI-RS resources to be multiplexed by the CSI-RSs corresponding to the N transmission schemes in a time division multiplexing manner, and/or a frequency division multiplexing manner, and/or a code division multiplexing manner, the quantity of RE resources occupied by CSI-RSs on each RB is less than or equal to 40, and therefore, when the protocol specification is complied with, the CSI-RS resources can be configured for all the CSI-RSs corresponding to the N transmission schemes, so that the N transmission schemes can be compatible.

In another embodiment, the configuring a time domain resource to be occupied by the CSI-RS corresponding to each of the N transmission schemes, so that the time domain resource occupied by the CSI-RS corresponding to each transmission scheme is different from a time domain resource occupied by a CSI-RS corresponding to another transmission scheme includes:

configuring a subframe offset of a sending periodicity of the CSI-RS corresponding to each of the N transmission schemes, so that the subframe offset of the sending periodicity of the CSI-RS corresponding to each transmission scheme is different from a subframe offset of a sending periodicity of the CSI-RS corresponding to the another transmission scheme.

Usually, a base station periodically sends a CSI-RS, and a sending periodicity of the CSI-RS includes two parameters: sending interval duration and a subframe offset. In time domain, one radio frame has a length of 10 milliseconds (ms) and includes 10 subframes. Based on this, in this embodiment, sending time of the CSI-RSs corresponding to the N transmission schemes is staggered, so that CSI-RSs corresponding to the N transmission schemes can occupy a same RE. Therefore, the N transmission schemes can be compatible when RE resources used for the CSI-RSs are limited.

In another embodiment, the configuring a time domain resource to be occupied by the CSI-RS corresponding to each of the N transmission schemes, so that the time domain resource occupied by the CSI-RS corresponding to each transmission scheme is different from a time domain resource occupied by a CSI-RS corresponding to another transmission scheme further includes:

configuring a start sending moment of the CSI-RS corresponding to each of the N transmission schemes, so that the start sending moment of the CSI-RS corresponding to each transmission scheme is different from a start sending moment of the CSI-RS corresponding to the another transmission scheme.

On a basis that subframe offsets of sending periodicities of the CSI-RSs corresponding to the N transmission schemes are set to be different, the start sending time of the CSI-RS corresponding to each of the N transmission schemes may be further set, so that the start sending time of the CSI-RS corresponding to each transmission scheme is different from the start sending time of the CSI-RS corresponding to the another transmission scheme. Therefore, sending time domains of the N transmission schemes are staggered in each dimension of the time domain, and an effect of multiplexing RE resources in a time division multiplexing manner is achieved.

In another embodiment, the configuring resource blocks RBs to be used, in a staggered manner, by the CSI-RSs corresponding to the N transmission schemes includes:

determining a start RB for sending the CSI-RSs corresponding to the N transmission schemes; and sequentially configuring, starting from the start RB, an $(i+nN)^{th}$ RB as an RB to be used by a CSI-RS corresponding to an $i^{th}$ transmission scheme in the N transmission schemes, where i is greater than or equal to 1 and less than or equal to N, and n is an integer greater than or equal to 0.

When a transmission scheme is used to send a CSI-RS to UE, the base station configures, on each RB, an RE resource for sending the CSI-RS, in other words, each RB carries the CSI-RS corresponding to the transmission scheme. In the embodiments of this application, in this embodiment, REs of different RBs are separately configured for the CSI-RSs corresponding to the N transmission schemes in a frequency domain density reduction manner, so that the N transmission schemes multiplex frequency domain resources.

In another embodiment, the configuring resource blocks RBs to be used, in a staggered manner, by the CSI-RSs corresponding to the N transmission schemes includes:

determining a start RB for sending the CSI-RSs corresponding to the N transmission schemes;

grouping the CSI-RSs corresponding to the N transmission schemes into m groups, where a quantity of CSI-RSs included in each of m−1 groups is 40, and a quantity of CSI-RSs included in one group is less than or equal to 40; and sequentially configuring, starting from the start RB, a $(j+nm)^{th}$ RB as an RB corresponding to a $j^{th}$ group of CSI-RSs in the m groups of CSI-RSs, where j is greater than or equal to 1 and less than or equal to m, and n is an integer greater than or equal to 0.

In this embodiment, the CSI-RSs corresponding to the N transmission schemes are grouped, and resources are configured for the CSI-RSs in a unit of groups. Therefore, unit utilization of the RBs for the N transmission schemes can be reduced, and RB resource utilization is improved.

In another embodiment, when N is an even number, the configuring a code resource for each of the N transmission schemes, so that CSI-RSs that occupy a same RE but correspond to different transmission schemes are encoded based on different code resources includes:

grouping the N transmission schemes in pairs, to obtain N/2 transmission scheme groups;

configuring one code group corresponding to each of the N/2 transmission scheme groups, where the code group includes two mask sequences that are orthogonal to each other, and the two mask sequences have a one-to-one correspondence with two transmission schemes in the corresponding transmission scheme group; and encoding, based on a mask in a corresponding mask sequence, the CSI-RS corresponding to each of the N transmission schemes.

In another embodiment, when N is an odd number, the configuring a code resource for each of the N transmission schemes, so that CSI-RSs that occupy a same RE but correspond to different transmission schemes are encoded based on different code resources includes:

adding one virtual transmission scheme having no corresponding CSI-RS;

grouping N+1 transmission schemes in pairs, to obtain (N+1)/2 transmission scheme groups;

configuring one code group corresponding to each of the (N+1)/2 transmission scheme groups, where the code group includes two mask sequences that are orthogonal to each other, two transmission schemes, in each of (N+1)/2−1 transmission scheme groups that are in the (N+1)/2 transmission scheme groups and that do not include the virtual transmission scheme, have a one-to-one correspondence with two mask sequences in a code group corresponding to each of the (N+1)/2−1 transmission scheme groups, and a transmission scheme, other than the virtual transmission scheme and in a transmission scheme group including the virtual transmission scheme, corresponds to any mask sequence in a code group corresponding to the transmission scheme group; and encoding, based on a mask in a corresponding mask sequence, the CSI-RS corresponding to each of the N transmission schemes.

A principle of code division multiplexing is that two mask sequences are respectively configured for two signal sequences, and the two mask sequences are quasi-orthogonal to each other. A signal in a signal sequence is encoded based on a mask in a mask sequence in the two mask sequences, a signal in the other signal sequence is encoded based on a mask in the other mask sequence, and the two encoded signals may be carried on a same time-frequency resource. Based on this, in this embodiment, mask sequences can be separately configured for the CSI-RSs corresponding to the N transmission schemes, so that CSI-RSs corresponding to the N transmission schemes multiplex an RE resource in a code division multiplexing manner.

In another embodiment, the configuring a code resource for each of the N transmission schemes, so that CSI-RSs that occupy a same RE but correspond to different transmission schemes are encoded based on different code resources includes:

when the N transmission schemes correspond to different quantities of CSI-RSs, combining CSI-RSs corresponding to transmission schemes that are in the N transmission schemes and that each correspond to a quantity of CSI-RSs less than a largest quantity of CSI-RSs corresponding to a transmission scheme in the N transmission schemes, to obtain Z CSI-RS sequences in total, where in the Z CSI-RS sequences, a quantity of CSI-RSs of each of Z−1 CSI-RS sequences is equal to the largest quantity of CSI-RSs corresponding to the transmission scheme in the N transmission schemes, a quantity of CSI-RSs of one CSI-RS sequence is less than or equal to the largest quantity of CSI-RSs corresponding to the transmission scheme in the N transmission schemes, and Z is less than or equal to N;

respectively configuring Z mask sequences for the Z CSI-RS sequences; and encoding, based on a mask in a corresponding mask sequence, each CSI-RS in the Z CSI-RS sequences.

In this embodiment, the CSI-RSs corresponding to the N transmission schemes are recombined, so that a quantity of mask sequences can be reduced, and utilization of a mask in the mask sequence can be improved.

In another embodiment, the configuring a code group corresponding to a transmission scheme group includes:

when the N transmission schemes correspond to the different quantities of CSI-RSs, determining whether a quantity of transmission schemes corresponding to the largest quantity of CSI-RSs is 1; and if the quantity of transmission schemes corresponding to the largest quantity of CSI-RSs is 1, configuring a quantity of masks in each of the mask sequences to be a target quantity, where the target quantity is the largest quantity of CSI-RSs corresponding to the transmission scheme in the N transmission schemes, or a second largest quantity of CSI-RSs corresponding to a transmission scheme in the N transmission schemes; or if the quantity of transmission schemes corresponding to the largest quantity of CSI-RSs is not 1, configuring a quantity of masks in each of the mask sequences to be the largest quantity of CSI-RSs.

Because one CSI-RS is encoded based on one mask, to ensure that CSI-RSs corresponding to the N transmission schemes share an RE, each of at least two CSI-RSs that occupy a same RE need to be encoded. Based on this, in this embodiment, it can be ensured that at least two CSI-RSs that occupy a same RE have corresponding masks, and therefore, normal execution of the code division multiplexing is ensured.

In another embodiment, after the configuring a code group, the method further includes:

sending each group of masks to UE corresponding to a corresponding transmission scheme.

One RE carries CSI-RSs corresponding to a plurality of transmission schemes, and a plurality of CSI-RSs carried on a same RE are encoded by using different masks. Therefore, in this embodiment, to enable corresponding UE to accurately identify a corresponding CSI-RS, the base station sends, to the corresponding UE in advance, a corresponding mask sequence and an RE corresponding to each mask, to help the UE to obtain the CSI-RS corresponding to the UE through decoding.

According to a second aspect, an embodiment of this application provides a CSI-RS sending device. The device includes modules configured to perform the method steps in the first aspect and the embodiments of the first aspect.

According to a third aspect, an embodiment of this application provides a base station. The base station includes a transceiver, a processor, and a memory. The transceiver, the processor, and the memory may be connected to each other through a bus system. The memory is configured to store a program, an instruction, or code. The processor is configured to execute the program, the instruction, or the code in the memory, to complete the method according to any one of the first aspect or the possible designs of the first aspect.

According to a fourth aspect, an embodiment of this application provides a computer-readable storage medium. The computer-readable storage medium stores an instruction; and when the instruction is run on a computer, the computer is enabled to perform the method according to any one of the first aspect or the possible designs of the first aspect.

According to the CSI-RS sending method and device, and the base station in the embodiments of this application, when the N transmission schemes are determined based on the capability of the UE in the cell, and the total quantity of the CSI-RSs corresponding to the N transmission schemes is greater than 40, the base station configures the sending resources to be multiplexed by the CSI-RSs corresponding to the N transmission schemes, so that CSI-RSs corresponding to different transmission schemes are carried on limited sending resources. N is greater than or equal to 2. It can be learned that according to the technical solutions in the embodiments of this application, when resources are limited, CSI-RSs corresponding to different transmission schemes are sent in a resource multiplexing manner, so that a plurality of transmission schemes can be compatible, and resource utilization can be improved.

BRIEF DESCRIPTION OF DRAWINGS

To describe technical solutions in embodiments of this application more clearly, the following briefly describes the accompanying drawings required for describing the embodiments. Clearly, persons of ordinary skill in the art may derive other drawings from these accompanying drawings without creative efforts.

DETAILED DESCRIPTION OF EMBODIMENTS

Figure 1:
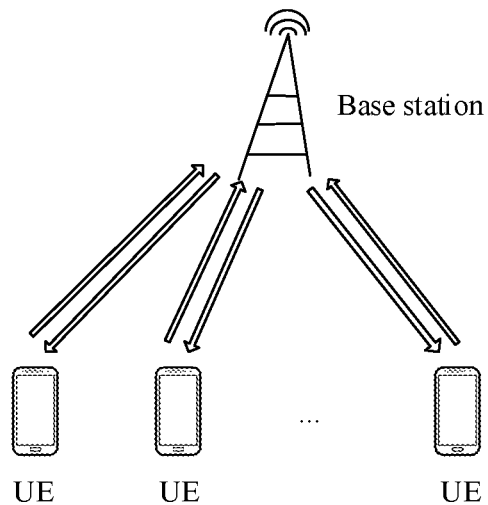
FIG. 1 is a schematic diagram of a massive MIMO scenario.

FIG. 1 is a schematic diagram of a massive MIMO scenario. FIG. 1 shows a base station. The base station includes at least one antenna array including m transmit antennas (mT) and m receive antennas (mR). UEs covered by the base station include n receive antennas and n transmit antennas in total. Both m and n are greater than 1. Based on this, a MIMO technology is a wireless communications technology in which a transmit end sends, by using a plurality of transmit antennas, signals to a plurality of receive antennas at a receive end. However, in the massive MIMO scenario, m is usually greater than or equal to 16.

The MIMO technology includes two types: open-loop MIMO and closed-loop MIMO. In the open-loop MIMO, UE does not need to feed back channel information. In the closed-loop MIMO, UE needs to feed back channel information, and a base station performs weighting and transmission based on the channel information fed back by the UE. TM9 is a transmission mode of the closed-loop MIMO. Based on this transmission mode, the base station may configure CSI-RS information for the UE, where the CSI-RS information is used by the UE to measure and feed back the channel information.

Specifically, TM9 includes a plurality of transmission schemes. For example, an R13/R14 standard protocol supports two CSI-RS information transmission schemes, including a class A scheme and a class B scheme. Class A scheme: The base station configures a set of CSI-RSs that are not precoded. For the R13, the CSI-RSs support 16 ports (P); for the R14, the CSI-RSs support 32P. Class B scheme: The base station configures a plurality of fixed beams through beam weight pre-weighting, to separately cover different areas in a cell range. For example, the base station configures four fixed beams, and each fixed beam supports 2P, 4P, or 8P; and if each fixed beam supports, for example, 4P, CSI-RSs configured by the base station in this embodiment support 4*4=16P.

When the CSI-RSs are configured, generally, one RE resource is configured on each RB for each port. For example, corresponding to the foregoing class A scheme, if the CSI-RSs support 32P, 32 RE resources of CSI-RSs need to be configured on each RB. Similarly, corresponding to the foregoing class B scheme, 16 RE resources of CSI-RSs need to be configured on each RB.

Different transmission schemes are applicable to UEs having different receiving capabilities. However, receiving capabilities of the UEs covered by the base station are different, and usually at least two transmission schemes need to be used to send CSI-RSs. A TM9 protocol specifies that a maximum of 40 REs can be configured on one RB for transmitting CSI-RS information. Therefore, a total quantity of RE resources, of CSI-RSs, required to be configured for the at least two transmission schemes is usually greater than 40, so that to comply with the protocol specification and ensure that UE having each receiving capability can receive a CSI-RS, an existing execution manner is to send a CSI-RS based on a transmission scheme to which UE having a poorest receiving capability is applicable.

It can be learned that due to insufficient RE resources required by the CSI-RSs, different transmission schemes cannot be compatible in an existing CSI-RS sending method. In view of this, technical solutions in embodiments of this application are provided.

The following describes the embodiments of this application with reference to the accompanying drawings.

Figure 2:
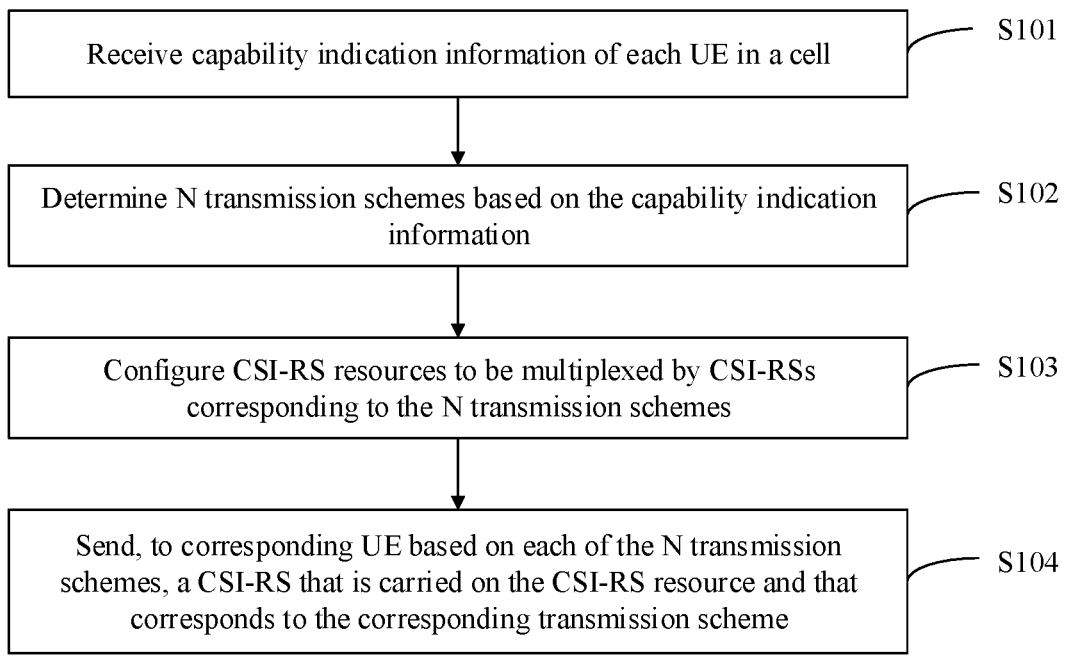
FIG. 2 is a flowchart of a CSI-RS sending method according to an embodiment of this application.

FIG. 2 is a flowchart of a CSI-RS sending method according to an embodiment of this application. According to the method 100 provided in this embodiment of this application, through multiplexing of sending resources, CSI-RSs corresponding to different transmission schemes are carried on limited RE resources, so that a plurality of transmission schemes can be compatible, and resource utilization can be improved. The method 100 includes the following steps.

Step S101: Receive capability indication information of each UE in a cell.

The capability indication information is a capability message reported by the UE to a base station when the UE initially accesses the base station. The capability message indicates a plurality of capabilities of the corresponding UE, including an access capability of the UE, and the access capability refers to a transmission rate supported by the corresponding UE.

Step S102: Determine N transmission schemes based on the capability indication information.

In this embodiment of this application, N is greater than or equal to 2, and is a quantity of transmission schemes simultaneously supported by the base station. A total quantity of CSI-RSs corresponding to the N transmission schemes is greater than 40.

After step S101, because different transmission schemes of TM9 correspond to different transmission rates, the base station may determine, based on the access capability of the UE, a CSI-RS transmission scheme applicable to each specific UE. Specifically, UEs may be classified based on access capabilities. One type of UE may correspond to one type of specific transmission scheme, and different types of UEs may correspond to different transmission schemes. Determining a transmission scheme applicable to UE based on an access capability of the UE is a relatively mature technology in the art. Details are not described herein in this embodiment of this application.

In an optional embodiment of this application, a cell includes, for example, two types of UEs, and the two types of UEs are respectively applicable to a class A scheme and a class B scheme. In addition, 32 CSI-RSs need to be configured for the class A scheme, and 8*4=32 CSI-RSs need to be configured for the class B scheme.

Step S103: Configure CSI-RS resources to be multiplexed by the CSI-RSs corresponding to the N transmission schemes.

The CSI-RS resources are radio sending resources carrying the CSI-RSs corresponding to the N transmission schemes.

The CSI-RS is a reference signal corresponding to an antenna port. After a sending port of the CSI-RS and a quantity of CSI-RSs are determined, the radio sending resources carrying the CSI-RSs corresponding to the N transmission schemes are configured by configuring radio resource control (RRC) information.

In this embodiment of this application, a total quantity of CSI-RSs for which REs need to be configured is greater than 40, if one RE is configured for each CSI-RS on one RB, a protocol specification is not complied with. Therefore, in this embodiment, through configuration of the CSI-RS resources to be time-division multiplexed, and/or frequency-division multiplexed, and/or code-division multiplexed by the CSI-RSs corresponding to the N transmission schemes, a quantity of RE resources occupied by CSI-RSs on each RB is less than or equal to 40, and therefore, when the protocol specification is complied with, the CSI-RS resources can be configured for all the CSI-RSs corresponding to the N transmission schemes, so that the N transmission schemes can be compatible.

Specifically, the configuring the resources to be time-division multiplexed by the CSI-RSs corresponding to the N transmission schemes includes: configuring a time domain resource to be occupied by the CSI-RS corresponding to each of the N transmission schemes, so that the time domain resource occupied by the CSI-RS corresponding to each transmission scheme is different from a time domain resource occupied by a CSI-RS corresponding to another transmission scheme; the configuring the resources to be frequency-division multiplexed by the CSI-RSs corresponding to the N transmission schemes includes: configuring resource blocks RBs to be used, in a staggered manner, by the CSI-RSs corresponding to the N transmission schemes, where a total quantity of resource elements REs occupied on each used RB is less than or equal to 40; and the configuring the resources to be code-division multiplexed by the CSI-RSs corresponding to the N transmission schemes includes: configuring a code resource for each of the N transmission schemes, so that CSI-RSs that occupy a same RE but correspond to different transmission schemes are encoded based on different code resources.

For example, a sending time domain of the 32 CSI-RSs corresponding to the class A scheme and a sending time domain of the 32 CSI-RSs corresponding to the class B scheme that are different are configured; and/or RBs to be occupied, in a staggered manner, by the 32 CSI-RSs corresponding to the class A scheme and the 32 CSI-RSs corresponding to the class B scheme are configured; and/or different code resources are separately configured for the class A scheme and the class B scheme, so that the 32 CSI-RSs corresponding to the class A scheme and the 32 CSI-RSs corresponding to the class B scheme are encoded based on the different code resources.

Step S104: Send, to corresponding UE based on each of the N transmission schemes, the CSI-RS that is carried on the CSI-RS resource and that corresponds to the corresponding transmission scheme.

Specifically, when the CSI-RSs corresponding to the N transmission schemes time-division multiplex the CSI-RS resources, corresponding CSI-RSs are sent to corresponding UEs in different time domains by using different transmission schemes; when the CSI-RSs corresponding to the N transmission schemes frequency-division multiplex the CSI-RS resources, a CSI-RS that is carried on an RB and that corresponds to a corresponding transmission scheme is sent to corresponding UE by using the corresponding transmission scheme; when the CSI-RSs corresponding to the N transmission schemes code-division multiplex the CSI-RS resources, code sequences corresponding to the N transmission schemes are separately sent to corresponding UEs in advance, and after the corresponding CSI-RSs are sent to the corresponding UEs by separately using the N transmission schemes, each UE performs decoding based on a code sequence received in advance, to obtain a corresponding CSI-RS.

It can be learned that in this embodiment of this application, through configuration of the resources to be multiplexed by the CSI-RSs corresponding to the N transmission schemes, when the resources are limited, the CSI-RSs can be sent by using the N transmission schemes, and therefore, different CSI-RS transmission schemes can be compatible.

The following separately describes, with reference to configuration processes, scenarios in which the CSI-RSs corresponding to the N transmission schemes multiplex the resources.

Based on the foregoing descriptions of a CSI-RS sending process, the base station configures the CSI-RS resource by configuring RRC information. The RRC information includes information such as a sending periodicity of a CSI-RS, a start sending moment, a subframe offset, an RB, and coding. Therefore, configuration of the following information belongs to configuration of the RRC information.

Configuration of time domain resources to be multiplexed by the CSI-RSs corresponding to the N transmission schemes:

Usually, the base station periodically sends a CSI-RS, and a sending periodicity of the CSI-RS includes two parameters: sending interval duration and a subframe offset. In time domain, one radio frame has a length of 10 milliseconds (ms) and includes 10 subframes, and one subframe has a length of 1 ms and includes two slots. The subframe offset indicates a specific subframe, in each periodicity, in which the CSI-RS is sent. For example, if the interval duration is 10 ms, and the subframe offset is 1, the CSI-RS is sent in the first subframe in each periodicity.

Based on this, in this embodiment of this application, a subframe offset of a sending periodicity of the CSI-RS corresponding to each of the N transmission schemes may be configured, so that the subframe offset of the sending periodicity of the CSI-RS corresponding to each transmission scheme is different from a subframe offset of a sending periodicity of the CSI-RS corresponding to the another transmission scheme. Therefore, sending time of the CSI-RSs corresponding to the N transmission schemes is staggered, so that CSI-RSs corresponding to the N transmission schemes can occupy a same RE. Therefore, the N transmission schemes can be compatible when RE resources used for the CSI-RSs are limited.

In an optional embodiment of this application, if two transmission schemes are, for example, an R14 class A scheme and an R13 class B scheme, a CSI-RS resource configuration table for the R14 class A scheme is shown in Table 1.

TABLE 1

| Beam | Frequency domain position | Periodicity and offset of a CSI-RS | Sending moment of the CSI-RS |
|---|---|---|---|
| 0 | ACDE | 10, 6 | 6, 16, 26 . . . |

A CSI-RS resource configuration table for the R13 class B scheme is shown in Table 2.

TABLE 2

| Beam | Frequency domain position | Periodicity and offset of a CSI-RS | Sending moment of the CSI-RS |
|---|---|---|---|
| 0 | A | 10, 1 | 1, 11, 21 . . . |
| 1 | C | 10, 1 | 1, 11, 21 . . . |
| 2 | D | 10, 1 | 1, 11, 21 . . . |
| 3 | E | 10, 1 | 1, 11, 21 . . . |

It can be learned that in this embodiment, for the R14 class A scheme, a sending periodicity of a CSI-RS is 10 ms, and a subframe offset is 6, that is, the CSI-RS is sent in the sixth subframe in each periodicity; for the R13 class B scheme, a sending periodicity of a CSI-RS is 10 ms, and a subframe offset is 1, that is, the CSI-RS is sent in the first subframe in each periodicity.

Figure 3:
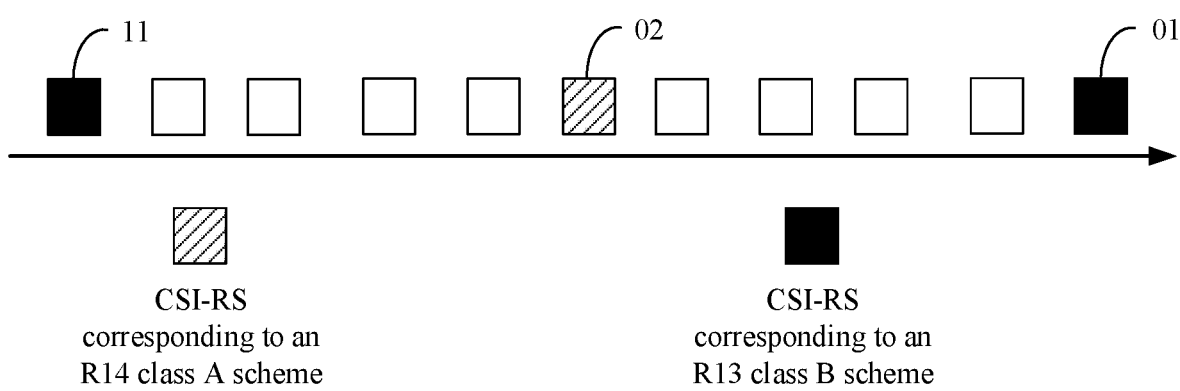
FIG. 3 is a schematic diagram of a CSI-RS sending time sequence according to an embodiment of this application.

With reference to Table 1 and Table 2, FIG. 3 is a schematic diagram of a CSI-RS sending time sequence according to an embodiment of this application, and shows a complete sending periodicity. A subframe 01 is the first subframe in this periodicity. At this moment, the CSI-RS corresponding to the R13 class B scheme is sent. A subframe 06 is the sixth subframe in this periodicity. At this moment, the CSI-RS corresponding to the R14 class A scheme is sent. When a moment corresponding to a subframe 11 arrives, the CSI-RS corresponding to the R13 class B scheme is sent again. No signal is configured for another subframe. Therefore, no operation is performed at a moment corresponding to the another subframe.

It can be learned that the CSI-RS corresponding to the R14 class A scheme and the CSI-RS corresponding to the R13 class B scheme may be carried at a same frequency domain position without affecting performance of each other, so that the R14 class A scheme and the R13 class B scheme can be compatible.

It should be noted that, in this embodiment of this application, sending periodicities of the CSI-RSs corresponding to the N transmission schemes may be configured to be the same, or may be configured to be different. For example, with reference to the foregoing example, the sending periodicity of the CSI-RS corresponding to the R14 class A scheme may alternatively be set to 5 ms. This is not limited in this embodiment of this application. When the sending periodicities of the CSI-RSs corresponding to the N transmission schemes are configured to be different, when subframe offsets corresponding to the various transmission schemes are configured, it is ensured that sending subframes corresponding to the N transmission schemes never overlap.

In addition, on a basis that the subframe offsets of the sending periodicities of the CSI-RSs corresponding to the N transmission schemes are set to be different, a start sending time of the CSI-RS corresponding to each of the N transmission schemes may be further set, so that the start sending time of the CSI-RS corresponding to each transmission scheme is different from a start sending time of the CSI-RS corresponding to the another transmission scheme. Therefore, sending time domains of the N transmission schemes are staggered in each dimension of the time domain.

For example, based on the foregoing subframe offsets, a start sending moment of the CSI-RS corresponding to the R14 class A scheme may be set to X ms, and a start sending moment of the CSI-RS corresponding to the R13 class B scheme may be set to Y ms, where Y ms is 0.5 ms later than X ms.

It should be understood that this embodiment is merely intended to support this solution, and constitutes no limitation on the technical solutions in the embodiments of this application. Based on this, the embodiments of this application are applicable to not only a scenario in which N is equal to 2, but also a scenario in which N is greater than 2. In addition, when N is greater than 2, configuration content is similar to that in the foregoing descriptions, and details are not described again in the embodiments of this application.

Configuration of frequency domain resources to be multiplexed by the CSI-RSs corresponding to the N transmission schemes:

Usually, when a transmission scheme is used to send a CSI-RS to UE, to improve CSI-RS transmission performance, the base station determines a total quantity of RBs based on bandwidth, and configures, on each RB, an RE resource for the to-be-sent CSI-RS, in other words, each RB carries the CSI-RS corresponding to the transmission scheme.

Based on this, in this embodiment of this application, REs of different RBs may be separately configured for the CSI-RSs corresponding to the N transmission schemes in a frequency domain density reduction manner. Specifically, RBs may be configured in the following two manners.

Manner 1: After the total quantity of RBs is determined based on the bandwidth and an RB number of a start RB is determined, starting from the start RB, an $(i+nN)^{th}$ RB is sequentially configured as an RB to be used by a CSI-RS corresponding to an $i^{th}$ transmission scheme in the N transmission schemes, where i is greater than or equal to 1 and less than or equal to N, and n is an integer greater than or equal to 0.

Specifically, each RB corresponds to a corresponding RB number. During configuration, the base station may determine, by configuring a value of a comb, a start RB corresponding to a corresponding transmission scheme, and configure, by configuring a density parameter, a distribution density of RBs on which a CSI-RS corresponding to the corresponding transmission scheme is located. In this embodiment of this application, the distribution density of RBs is used to indicate an interval of RBs at which one RB is selected as an RB of the CSI-RS corresponding to the corresponding transmission scheme.

For example, the comb is set to 0, indicating that a start frequency domain RB is an RB 0, and the density is set to d2, indicating that the distribution density of RBs of the CSI-RS corresponding to the corresponding transmission scheme is ½, that is, starting from the RB 0, one RB is selected at an interval of one RB as the RB of the CSI-RS corresponding to the corresponding transmission scheme.

With reference to the two transmission schemes: the R14 class A scheme and the R13 class B scheme, if the total quantity of RBs is, for example, 30 and the start RB is, for example, the RB 0, CSI-RS resources corresponding to the R14 class A scheme may be configured based on the comb=0 and the density=d2, and CSI-RS resources corresponding to the R13 class B scheme may be configured based on the comb=1 and the density=d2. It indicates that a start frequency domain RB of the CSI-RS corresponding to the R14 class A scheme is the RB 0, and a distribution density of RBs of the CSI-RS is ½; a start frequency domain RB of the CSI-RS corresponding to the R13 class B scheme is the RB 0, and a distribution density of RBs of the CSI-RS is ½.

Figure 4:
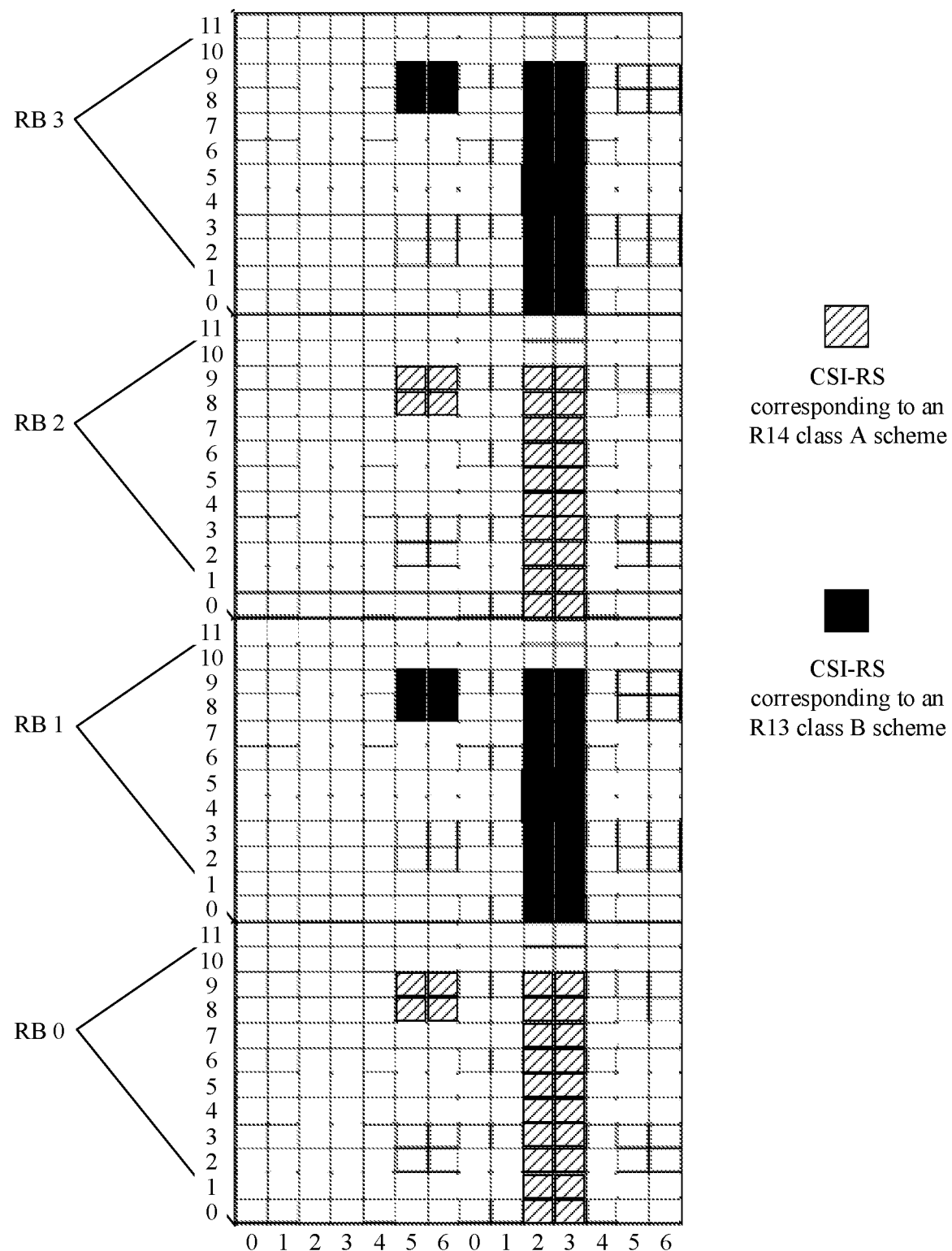
FIG. 4 is a schematic structural diagram of frequency domain resource distribution according to an embodiment of this application.

To be specific, FIG. 4 is a schematic structural diagram of frequency domain resource distribution. REs of an RB 0 and an RB 2 that are shown in FIG. 4, and REs of another RB, not shown in FIG. 4, whose RB number is an even number are configured as the CSI-RS resources corresponding to the R14 class A scheme. REs of an RB 1 and an RB 3 that are shown in FIG. 4, and REs of another RB, not shown in FIG. 4, whose RB number is an odd number are configured as the CSI-RS resources corresponding to the R13 class B scheme.

It should be understood that an embodiment in which a frequency domain density is correspondingly reduced to ½ when N is equal to 2 is only an optional embodiment of this application. Similar to this embodiment, when N is greater than 2, the frequency domain density may be correspondingly reduced to 1/N.

For example, in another optional embodiment of this application, N is equal to 3, and RBs include an RB 0 to an RB 29. When CSI-RS resources are configured, CSI-RS resources corresponding to the first transmission scheme are configured based on the comb=0 and the density=d3, CSI-RS resources corresponding to the second transmission scheme are configured based on the comb=1 and the density=d3, and CSI-RS resources corresponding to the third transmission scheme are configured based on the comb=2 and the density=d3. This configuration mode indicates: a distribution density of RBs of each of a CSI-RS corresponding to the first transmission scheme, a CSI-RS corresponding to the second transmission scheme, and a CSI-RS corresponding to the third transmission scheme is ⅓; and a start frequency domain RB of the CSI-RS corresponding to the first transmission scheme is the RB 0, a start frequency domain RB of the CSI-RS corresponding to the second transmission scheme is the RB 1, and a start frequency domain RB of the CSI-RS corresponding to the third transmission scheme is the RB 2.

Figure 5:
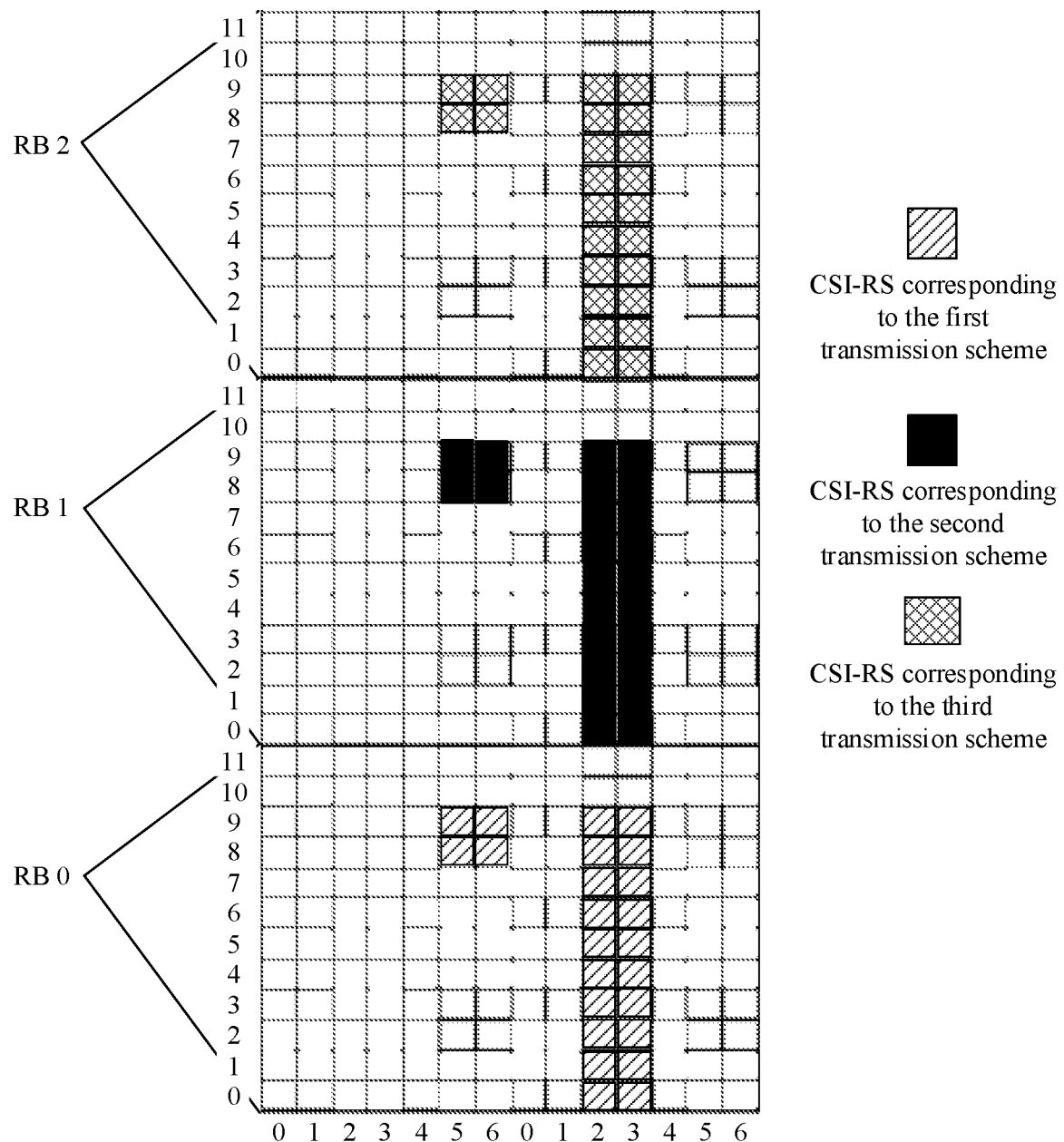
FIG. 5 is a schematic structural diagram of frequency domain resource distribution in another embodiment of this application.

FIG. 5 is a schematic structural diagram of frequency domain resource distribution when N is equal to 3. REs of an RB 0 shown in FIG. 5 and REs of an RB 3 that is not shown in FIG. 5 are configured as the CSI-RS resources corresponding to the first transmission scheme; REs of an RB 1 shown in FIG. 5 and REs of an RB 4 that is not shown in FIG. 5 are configured as the CSI-RS resources corresponding to the second transmission scheme; and REs of an RB 2 shown in FIG. 5 and REs of an RB 5 that is not shown in FIG. 5 are configured as the CSI-RS resources corresponding to the third transmission scheme. Configuration of each RB follows this sequence.

It should be understood that, in the manner 1, configuration of the RBs in a staggered manner in a unit of transmission schemes should be performed on a premise that a total quantity of CSI-RSs corresponding to each transmission scheme is less than 40, so that if a total quantity of CSI-RSs corresponding to at least one of the N transmission schemes is greater than 40, the manner 1 cannot be normally implemented. In view of this, the embodiments of this application further provide a manner 2.

Manner 2: The CSI-RSs corresponding to the N transmission schemes are grouped into m groups, where a quantity of CSI-RSs included in each of m−1 groups is 40, and a quantity of CSI-RSs included in one group is less than or equal to 40; and after a start RB is determined, starting from the start RB, a $(j+nm)^{th}$ RB is sequentially configured as an RB corresponding to a $j^{th}$ group of CSI-RSs in the m groups of CSI-RSs, where j is greater than or equal to 1 and less than or equal to m, and n is an integer greater than or equal to 0.

Specifically, the base station may divide the CSI-RSs into a plurality of parts based on a specified minimum unit, and further combine the plurality of parts of CSI-RSs obtained after division, to form the foregoing m groups. To facilitate resource configuration and CSI-RS sending, the minimum unit for dividing the CSI-RSs should be a common divisor of 40 and a quantity of antenna ports configured for the N transmission schemes, for example, 4. In addition, to facilitate the CSI-RS sending, when the plurality of parts of CSI-RSs are grouped, CSI-RSs corresponding to a same transmission scheme are grouped into one group as much as possible. This facilitates determining of a correspondence among a transmission scheme, an RB, and UE, and further facilitates the CSI-RS sending.

Alternatively, if a total quantity of CSI-RSs corresponding to each of the N transmission schemes is less than 40, the base station may alternatively combine a part of or all CSI-RSs corresponding to the second transmission scheme in the N transmission schemes with CSI-RSs corresponding to the first transmission scheme to obtain 40 CSI-RSs, so that the first group of CSI-RSs is formed; combine a part of or all CSI-RSs corresponding to the third transmission scheme with a remaining CSI-RSs corresponding to the second transmission scheme to obtain 40 CSI-RSs, so that the second group of CSI-RSs is formed. The m groups of CSI-RSs are obtained by analogy.

For example, in an optional embodiment of this application, three transmission schemes are included in a cell. Both the first transmission scheme and the third transmission scheme correspond to 32 CSI-RSs, and the second transmission scheme corresponds to 16 CSI-RSs. Eight CSI-RSs corresponding to the second transmission scheme are combined with the 32 CSI-RSs corresponding to the first transmission scheme to obtain the first group of CSI-RSs, and the other eight CSI-RSs corresponding to the second transmission scheme are combined with the 32 CSI-RSs corresponding to the third transmission scheme to obtain the second group of CSI-RSs. For another example, if the three transmission schemes each correspond to 32 CSI-RSs, eight CSI-RSs corresponding to the second transmission scheme are combined with the 32 CSI-RSs corresponding to the first transmission scheme to obtain the first group of CSI-RSs, 16 CSI-RSs corresponding to the third transmission scheme are combined with remaining 24 CSI-RSs corresponding to the second transmission scheme to obtain the second group of CSI-RSs, and remaining 16 CSI-RSs corresponding to the third transmission scheme are used as the third group of CSI-RSs.

Further, after the CSI-RSs corresponding to the N transmission schemes are grouped, an RB is configured for each group of CSI-RSs. In this embodiment, RBs to be used by the m groups of CSI-RSs in a staggered manner are configured. Specifically, a configuration manner is similar to that in the manner 1, and details are not described again in this embodiment.

It should be noted that, in this embodiment, one RB carries CSI-RSs corresponding to a plurality of transmission schemes. Therefore, when the CSI-RSs are sent to UE, one RB is sent to UEs corresponding to the plurality of transmission schemes. To enable corresponding UE to accurately identify a corresponding CSI-RS, in this embodiment, the base station may send, to the corresponding UE, a correspondence between an RE and a CSI-RS, to help the UE to read the CSI-RS corresponding to the UE.

In this embodiment, the CSI-RSs corresponding to the N transmission schemes are grouped, and resources are configured for the CSI-RSs in a unit of groups. Therefore, unit utilization of the RBs for the N transmission schemes can be reduced, and RB resource utilization is improved.

Configuration of code resources to be multiplexed by the CSI-RSs corresponding to the N transmission schemes:

In the embodiments of this application, masks may alternatively be defined for the CSI-RSs corresponding to the N transmission schemes, so that CSI-RSs corresponding to different transmission schemes occupy a same RE resource after being encoded by using different masks. When receiving a corresponding CSI-RS, UE obtains, through decoding by using a corresponding mask, the corresponding CSI-RS.

According to a principle of code division multiplexing, usually, two mask sequences are respectively configured for two signal sequences, and the two mask sequences are quasi-orthogonal to each other. A signal in a signal sequence is encoded based on a mask in a mask sequence in the two mask sequences, a signal in the other signal sequence is encoded based on a mask in the other mask sequence, and the two encoded signals may be carried on a same time-frequency resource. In this embodiment of this application, two mask sequences that are orthogonal to each other are referred to as a code group. Based on this, in this embodiment, when N is equal to 2, one code group may be configured; when N is greater than 2, mask sequences may be separately configured for the CSI-RSs corresponding to the N transmission schemes by configuring a plurality of code groups, so that CSI-RSs corresponding to the N transmission schemes share an RE resource.

Specifically, in this embodiment of this application, when N is an even number, the N transmission schemes may be first grouped in pairs, to obtain N/2 transmission scheme groups, and a code group is configured for each of the N/2 transmission scheme groups, where each code group includes two mask sequences that are orthogonal to each other, and the two mask sequences have a one-to-one correspondence with two transmission schemes in a corresponding transmission scheme group. Then, the CSI-RS corresponding to each of the N transmission schemes is encoded based on a mask in a corresponding mask sequence.

For example, when N is 4, the first transmission scheme and the second transmission scheme may be grouped into a group, and the third transmission scheme and the fourth transmission scheme may be grouped into a group; and then, two code groups are configured, and the two code groups each include two mask sequences that are orthogonal to each other. The two mask sequences in the first code group have a one-to-one correspondence with the first transmission scheme and the second transmission scheme, and the two mask sequences in the second code group have a one-to-one correspondence with the third transmission scheme and the fourth transmission scheme.

When N is an odd number, because mask sequences are configured in pairs, one virtual transmission scheme having no corresponding CSI-RS is added, to obtain N+1 transmission schemes. Then, the N+1 transmission schemes are grouped in pairs, to obtain (N+1)/2 transmission scheme groups, and similarly, a code group is configured for each transmission scheme group, where each code group includes two mask sequences that are orthogonal to each other. Two transmission schemes, in each of (N+1)/2−1 transmission scheme groups that are in the (N+1)/2 transmission scheme groups and that do not include the virtual transmission scheme, have a one-to-one correspondence with two mask sequences in a code group corresponding to each of the (N+1)/2−1 transmission scheme groups, and a transmission scheme, other than the virtual transmission scheme and in a transmission scheme group including the virtual transmission scheme, corresponds to any mask sequence in a code group corresponding to the transmission scheme group. Further, the CSI-RS corresponding to each of the N transmission schemes is encoded based on a mask in a corresponding mask sequence.

For example, when N is 3, one virtual transmission scheme having no corresponding signal is added. Then the first transmission scheme and the second transmission scheme are grouped into a group, and the third transmission scheme and the virtual transmission scheme are grouped into a group; and similarly, two code groups are configured, where the two code groups each include two mask sequences that are orthogonal to each other. The two mask sequences in the first code group have a one-to-one correspondence with the first transmission scheme and the second transmission scheme, and the third transmission scheme corresponds to any mask sequence in the second code group.

In addition, the N transmission schemes may correspond to different quantities of CSI-RSs. When the N transmission schemes correspond to the different quantities of CSI-RSs, in this embodiment of this application, a largest quantity W of CSI-RSs corresponding to a transmission scheme in the N transmission schemes may be determined, and CSI-RSs corresponding to transmission schemes that each correspond to a quantity of CSI-RSs less than W are combined, to finally obtain Z CSI-RS sequences. Further, Z mask sequences are respectively configured corresponding to the Z CSI-RS sequences, and each CSI-RS in the Z CSI-RS sequences is encoded based on a mask in a corresponding mask sequence. W is a multiple of 8, and Z is less than or equal to N.

In the Z CSI-RS sequences, a quantity of CSI-RSs of each of Z−1 CSI-RS sequences is W, and a quantity of CSI-RSs of one CSI-RS sequence is less than or equal to W.

It should be noted that, the Z mask sequences are respectively configured corresponding to the Z CSI-RS sequences. A configuration method is similar to that in the foregoing descriptions. Similarly, whether Z is an even number may be first determined, and further, the Z CSI-RS sequences are grouped and a code group is configured corresponding to each group. Specifically, for details, refer to the foregoing descriptions. Details are not described again herein in this embodiment of this application.

For example, when N is 3, the first transmission scheme includes 32 CSI-RSs, and the second transmission scheme and the third transmission scheme each include 16 CSI-RSs, the 32 CSI-RSs corresponding to the first transmission scheme may be used as the first CSI-RS sequence, the 16 CSI-RSs corresponding to the second transmission scheme and the 16 CSI-RSs corresponding to the third transmission scheme are combined as the second CSI-RS sequence, and then a code group is configured corresponding to the two CSI-RS sequences, where two mask sequences in the code group each include 32 masks.

It should be noted that, through code division multiplexing, two, four, or eight masks may be defined as one group according to a protocol, and one mask sequence includes at least one mask group. For example, in an optional example of this application, it is defined that a mask group includes eight masks; and if 32 masks need to be configured for a mask sequence, four mask groups are included. In this embodiment, the mask sequence may be an orthogonal cover code (OCC) sequence.

Because one CSI-RS is encoded based on one mask, and the N transmission schemes may correspond to the different quantities of CSI-RSs, to ensure that the CSI-RSs corresponding to the N transmission schemes share an RE, each of at least two CSI-RSs that occupy a same RE need to be encoded. Therefore, when the N transmission schemes correspond to a same quantity of CSI-RSs, a quantity of masks included in any mask sequence is the same as a quantity of CSI-RSs corresponding to each transmission scheme. When the N transmission schemes correspond to the different quantities of CSI-RSs, if a quantity of transmission schemes corresponding to the largest quantity of CSI-RSs is 1, a quantity of masks in any mask sequence is equal to the largest quantity of CSI-RSs or a second largest quantity of CSI-RSs; if a quantity of transmission schemes corresponding to the largest quantity of CSI-RSs is not 1, a quantity of masks in any mask sequence is equal to the largest quantity of CSI-RSs.

For example, when the transmission schemes include two types: the R14 class A scheme and the R13 class B scheme, and the two types of transmission schemes each include 32 CSI-RSs, one orthogonal code group may be configured.

Figure 6:
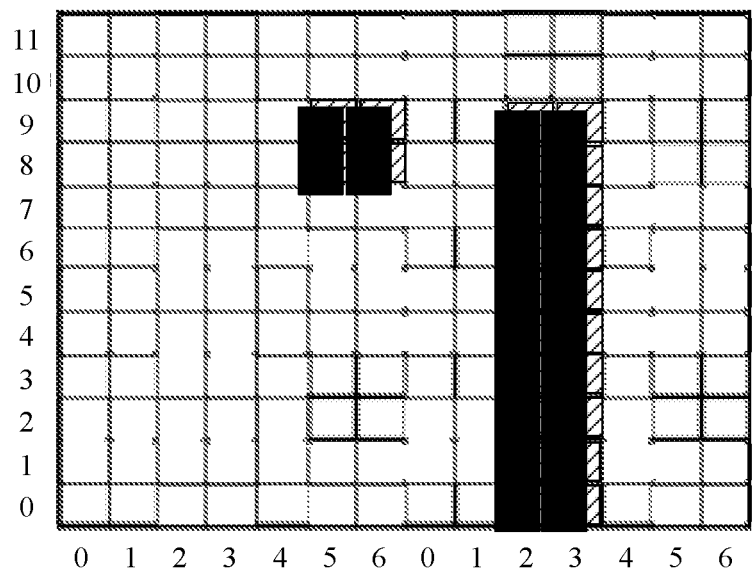
FIG. 6 is a schematic effect diagram of code division multiplexing according to an embodiment of this application.

The orthogonal code group includes a first mask sequence and a second mask sequence. The first mask sequence includes mask groups 1 to 4 and the second mask sequence includes mask groups 5 to 8. Each mask group includes eight masks. The 32 masks in the first mask sequence have a one-to-one correspondence with the 32 CSI-RSs corresponding to the R14 class A scheme, and are used to encode the 32 CSI-RSs corresponding to the R14 class A scheme. The 32 masks in the second mask sequence have a one-to-one correspondence with the 32 CSI-RSs corresponding to the R13 class B scheme, and are used to encode the 32 CSI-RSs corresponding to the R13 class B scheme. FIG. 6 is a schematic diagram of code division multiplexing after encoding and resource configuration are performed. One RE carries one CSI-RS corresponding to the R14 class A scheme and one CSI-RS corresponding to the R13 class B scheme, so that RE multiplexing is implemented, and the R14 class A scheme and the R13 class B scheme can be compatible.

Figure 7:
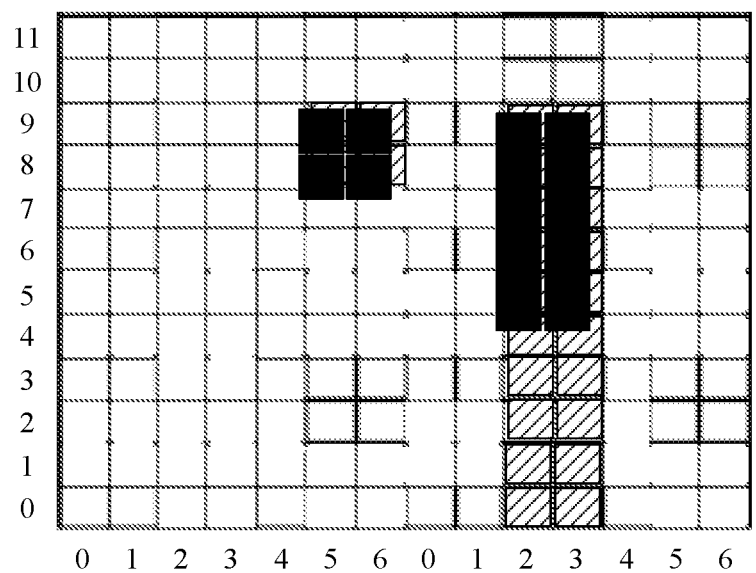
FIG. 7 is a schematic effect diagram of code division multiplexing in another embodiment of this application.

For another example, if the R14 class A scheme corresponds to 32 CSI-RSs, and the R13 class B scheme corresponds to 16 CSI-RSs, 16 REs each carry two CSI-RSs, and the two CSI-RSs carried on each RE need to be encoded; other 16 REs each carry one CSI-RS, and the CSI-RS carried on each RE may not be encoded. Therefore, each mask sequence should include at least 16 masks. FIG. 7 is a schematic diagram of code division multiplexing after encoding and resource configuration are performed.

For another example, when N is 3, the first transmission scheme and the second transmission scheme each include 32 CSI-RSs, and the third transmission scheme includes 16 CSI-RSs, 32 REs each carry at least two CSI-RSs, and the at least two CSI-RSs carried on each of the 32 REs need to be encoded. Therefore, in this embodiment solution, each mask sequence should include 32 masks.

It should be noted that, in this embodiment, one RE carries CSI-RSs corresponding to a plurality of transmission schemes, and a plurality of CSI-RSs carried on a same RE are encoded by using different masks. Therefore, in this embodiment, to enable corresponding UE to accurately identify a corresponding CSI-RS, the base station sends, to the corresponding UE in advance, a corresponding mask sequence and an RE corresponding to each mask, to help the UE to obtain the CSI-RS corresponding to the UE through decoding.

The foregoing is descriptions of the three resource multiplexing manners when the three resource multiplexing manners are independently used. In the embodiments of this application, the foregoing three resource multiplexing manners may be used in combination.

For example, in an optional embodiment, N is equal to 4, and it may be configured that a CSI-RS corresponding to the first transmission scheme and a CSI-RS corresponding to the second transmission scheme code-division multiplex a resource, a CSI-RS corresponding to the third transmission scheme and a CSI-RS corresponding to the fourth transmission scheme code-division multiplex a resource, and then the CSI-RSs, after code division multiplexing, corresponding to the first transmission scheme and the second transmission scheme and the CSI-RSs, after code division multiplexing, corresponding to the third transmission scheme and the fourth transmission scheme time-division multiplex a resource. Alternatively, it is configured that the CSI-RSs, after code division multiplexing, corresponding to the first transmission scheme and the second transmission scheme and the CSI-RSs, after code division multiplexing, corresponding to the third transmission scheme and the fourth transmission scheme frequency-division multiplex a resource. Alternatively, it is configured that a CSI-RS corresponding to the first transmission scheme and a CSI-RS corresponding to the second transmission scheme occupy a same RB in a time division multiplexing manner, a CSI-RS corresponding to the third transmission scheme and a CSI-RS corresponding to the fourth transmission scheme occupy a same RB in a time division multiplexing manner, and the CSI-RSs corresponding to the first transmission scheme and the second transmission scheme and the CSI-RSs corresponding to the third transmission scheme and the fourth transmission scheme occupy RBs in a staggered manner.

Specifically, any combination may be used in the embodiments of this application. Details are not described herein.

In conclusion, in the embodiments of this application, the base station configures the CSI-RS resources for the N different transmission schemes in the time division multiplexing manner, and/or the frequency division multiplexing manner, and/or the code division multiplexing manner. Therefore, when RE resources are limited, the CSI-RSs are sent by using the N different transmission schemes, so that a plurality of transmission schemes can be compatible, and resource utilization can be improved.

Figure 8:
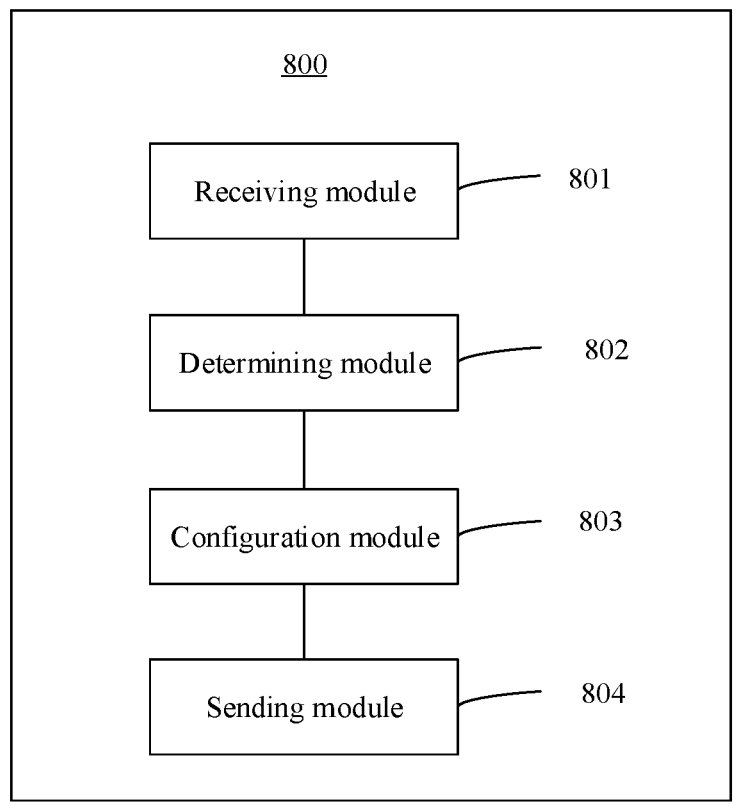
FIG. 8 is a schematic structural diagram of a CSI-RS sending device according to an embodiment of this application.

FIG. 8 is a schematic structural diagram of a CSI-RS sending device according to an embodiment of this application. The CSI-RS sending device 800 may be configured to perform the CSI-RS sending method corresponding to FIG. 2 to FIG. 7. As shown in FIG. 8, the CSI-RS sending device 800 includes a receiving module 801, a determining module 802, a configuration module 803, and a sending module 804. The receiving module 801 and the sending module 804 may be specifically configured to perform information receiving and sending in the method 100. The determining module 802 and the configuration module 803 are specifically configured to perform processing other than the information receiving and sending in the method 100.

For example, the receiving module 801 may be configured to receive capability indication information of each UE in a cell. The determining module 802 may be configured to determine N transmission schemes based on the capability indication information, where N is greater than or equal to 2, and a total quantity of CSI-RSs corresponding to the N transmission schemes is greater than 40. The configuration module 803 may be configured to configure CSI-RS resources to be multiplexed by the CSI-RSs corresponding to the N transmission schemes, where the CSI-RS resources are radio sending resources carrying the CSI-RSs corresponding to the N transmission schemes. The sending module 804 may be configured to send, to corresponding UE based on each of the N transmission schemes, a CSI-RS that is carried on the CSI-RS resource and that corresponds to the corresponding transmission scheme.

For specific content, refer to the descriptions of the related part in the method 100, and details are not described herein again.

Figure 9:
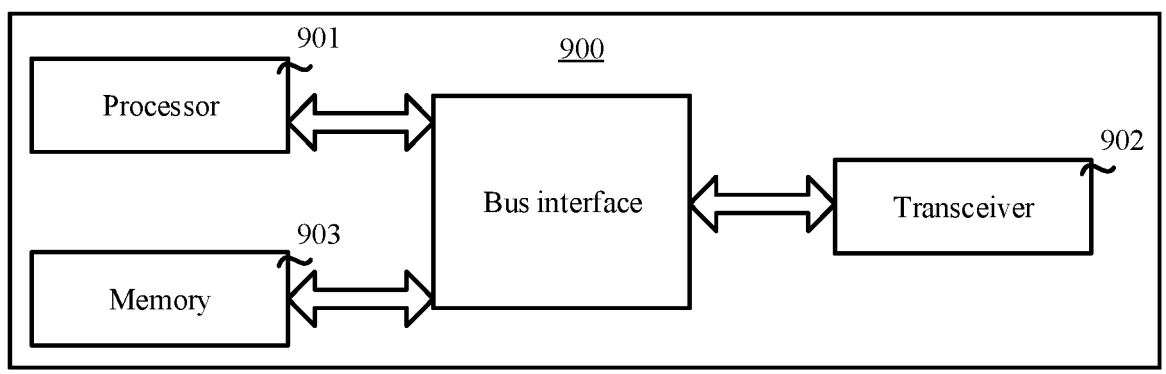
FIG. 9 is a schematic structural diagram of a base station according to an embodiment of this application.

It should be understood that division of the foregoing modules is merely logical function division. During actual embodiment, all or some of the modules may be integrated into a physical entity, or may be physically separate. In this embodiment of this application, the receiving module 801 and the sending module 804 may be implemented by a transceiver, and the determining module 802 and the configuration module 803 may be implemented by a processor. As shown in FIG. 9, a base station 900 may include a processor 901, a transceiver 902, and a memory 903. The memory 903 may be configured to store a program/code pre-installed by the base station 900 before delivery, or may store code or the like used for execution of the processor 901.

It should be understood that the base station 900 in this embodiment of this application corresponds to the embodiment in the method 100 in the embodiments of this application. The transceiver 902 is configured to perform information receiving and sending in the method 100, and the processor 901 is configured to perform processing other than the information receiving and sending in the method 100. Details are not described herein again.

During specific embodiment, corresponding to the base station 900, an embodiment of this application further provides a computer storage medium. The computer storage medium disposed in the base station may store a program, and when the program is executed, some or all of the steps of the embodiments in the method of FIG. 2 to FIG. 7 may be implemented. The storage medium in the base station may be a magnetic disk, an optical disc, a read-only memory (ROM), a random access memory (random access memory, RAM), or the like.

The transceiver in the embodiments of this application may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (CPU), a network processor ( ), or a combination of the CPU and the NP. The processor may further include a hardware chip. The hardware chip may be an application-specific integrated circuit (ASIC), a programmable logic device (PLD), or a combination thereof. The PLD may be a complex programmable logic device (CPLD), a field programmable logic gate array (FPGA), generic array logic (GAL), or any combination thereof. The memory may include a volatile memory, for example, a random access memory (RAM); or may include a non-volatile memory, for example, a read-only memory (ROM), a flash memory, a hard disk drive (HDD), or a solid-state drive (SSD); or may include a combination of the foregoing types of memories.

FIG. 9 may further include a bus interface. The bus interface may include any quantity of interconnected buses and bridges, and specifically link together various circuits of one or more processors represented by the processor and a memory represented by the memory. The bus interface may further link together various other circuits, such as a peripheral device, a voltage stabilizer, and a power management circuit. These are well known in the art, and therefore are not further described in this specification. The bus interface provides an interface. The transceiver provides a unit configured to communicate with various other devices on a transmission medium. The processor is responsible for managing a bus architecture and common processing. The memory may store data used when the processor performs an operation.

Persons skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. Persons skilled in the art may use various methods to implement the described functions for each particular application, but it should not be considered that the embodiment goes beyond the protection scope of the embodiments of this application.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the method or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may be further integrated into a processor. The processor and the storage medium may be disposed in an ASIC, and the ASIC may be disposed in UE. Optionally, the processor and the storage medium may be alternatively disposed in different components of the UE.

It should be understood that sequence numbers of the processes do not mean execution sequences in various embodiments of this application. The execution sequences of the processes should be determined based on functions and internal logic of the processes, and should not be construed as any limitation on the embodiment processes of the embodiments of this application.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive), or the like.

All parts in this specification are described in a progressive manner. For same or similar parts in the embodiments, refer to these embodiments, and each embodiment focuses on a difference from another embodiment. Especially, apparatus and system embodiments are basically similar to the method embodiment, and therefore are described briefly. For related parts, refer to partial descriptions in the method embodiment.

In addition, unless otherwise specified, ordinal numbers such as "first" and "second" in the embodiments of this application are used to distinguish between a plurality of objects, but are not intended to limit a sequence of the plurality of objects.

Although some preferred embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Clearly, persons skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A channel state information-reference signal (CSI-RS) sending method, comprising:
   receiving capability indication information of each user equipment (UE) in a cell;
   determining N transmission schemes based on the capability indication information, wherein N is greater than or equal to 2, and a total quantity of CSI-RSs corresponding to the N transmission schemes is greater than 40;
   configuring CSI-RS resources to be multiplexed by the CSI-RSs corresponding to the N transmission schemes, wherein the CSI-RS resources are radio sending resources carrying the CSI-RSs corresponding to the N transmission schemes;
   and sending, to a corresponding UE based on each of the N transmission schemes, a CSI-RS that is carried on the CSI-RS resource and that corresponds to the corresponding transmission scheme.

2. The CSI-RS sending method according to claim 1, wherein the configuring CSI-RS resources to be multiplexed by the CSI-RSs corresponding to the N transmission schemes comprises:
   configuring a time domain resource to be occupied by the CSI-RS corresponding to each of the N transmission schemes, so that the time domain resource occupied by the CSI-RS corresponding to each of the N transmission schemes is different from a time domain resource occupied by a CSI-RS corresponding to another transmission scheme;
   and/or configuring resource blocks (RBs) to be used, in a staggered manner, by the CSI-RSs corresponding to the N transmission schemes, wherein a total quantity of resource elements (Res) occupied on each used RB is less than or equal to 40;
   and/or configuring a code resource for each of the N transmission schemes, so that CSI-RSs that occupy a same RE but correspond to different transmission schemes are encoded based on different code resources.

3. The CSI-RS sending method according to claim 2, wherein the configuring a time domain resource to be occupied by the CSI-RS corresponding to each of the N transmission schemes comprises:
   configuring a subframe offset of a sending periodicity of the CSI-RS corresponding to each of the N transmission schemes, so that the subframe offset of the sending periodicity of the CSI-RS corresponding to each of the N transmission schemes is different from a subframe offset of a sending periodicity of the CSI-RS corresponding to the another transmission scheme.

4. The CSI-RS sending method according to claim 3, wherein the configuring a time domain resource to be occupied by the CSI-RS corresponding to each of the N transmission schemes further comprises:
   configuring a start sending moment of the CSI-RS corresponding to each of the N transmission schemes, so that the start sending moment of the CSI-RS corresponding to each of the N transmission schemes is different from a start sending moment of the CSI-RS corresponding to the another transmission scheme.

5. The CSI-RS sending method according to claim 2, wherein the configuring resource blocks (RBs) to be used, in a staggered manner, by the CSI-RSs corresponding to the N transmission schemes comprises:
   determining a start RB for sending the CSI-RSs corresponding to the N transmission schemes;
   and sequentially configuring, starting from the start RB, an $(i+nN)^{th}$ RB as an RB to be used by a CSI-RS corresponding to an $i^{th}$ transmission scheme in the N transmission schemes, wherein i is greater than or equal to 1 and less than or equal to N, and n is an integer greater than or equal to 0.

6. The CSI-RS sending method according to claim 2, wherein the configuring resource blocks (RBs) to be used, in a staggered manner, by the CSI-RSs corresponding to the N transmission schemes comprises:
   determining a start RB for sending the CSI-RSs corresponding to the N transmission schemes;
   grouping the CSI-RSs corresponding to the N transmission schemes into m groups, wherein a quantity of CSI-RSs comprised in each of m−1 groups is 40, and a quantity of CSI-RSs comprised in one group is less than or equal to 40;
   and sequentially configuring, starting from the start RB, a $(j+nm)^{th}$ RB as an RB corresponding to a $j^{th}$ group of CSI-RSs in the m groups of CSI-RSs, wherein j is greater than or equal to 1 and less than or equal to m, and n is an integer greater than or equal to 0.

7. The CSI-RS sending method according to claim 2, wherein when N is an even number, the configuring a code resource for each of the N transmission schemes comprises:
   grouping the N transmission schemes in pairs, to obtain N/2 transmission scheme groups;
   configuring one code group corresponding to each of the N/2 transmission scheme groups, wherein the one code group comprises two mask sequences that are orthogonal to each other, and the two mask sequences have a one-to-one correspondence with two transmission schemes in the corresponding transmission scheme group;

and encoding, based on a mask in a corresponding mask sequence, the CSI-RS corresponding to each of the N transmission schemes.

8. The CSI-RS sending method according to claim 2, wherein when N is an odd number, the configuring a code resource for each of the N transmission schemes comprises:
adding one virtual transmission scheme having no corresponding CSI-RS;
grouping N+1 transmission schemes in pairs, to obtain (N+1)/2 transmission scheme groups;
configuring one code group corresponding to each of the (N+1)/2 transmission scheme groups, wherein the one code group comprises two mask sequences that are orthogonal to each other, two transmission schemes, in each of (N+1)/2−1 transmission scheme groups that are in the (N+1)/2 transmission scheme groups and that do not comprise the virtual transmission scheme, have a one-to-one correspondence with two mask sequences in a code group corresponding to each of the (N+1)/2−1 transmission scheme groups, and a transmission scheme, other than the virtual transmission scheme and in a transmission scheme group comprising the virtual transmission scheme, corresponds to any mask sequence in a code group corresponding to the transmission scheme group;
and encoding, based on a mask in a corresponding mask sequence, the CSI-RS corresponding to each of the N transmission schemes.

9. The CSI-RS sending method according to claim 2, wherein the configuring a code resource for each of the N transmission schemes comprises:
when the N transmission schemes correspond to different quantities of CSI-RSs, combining CSI-RSs corresponding to transmission schemes that are in the N transmission schemes and that each correspond to a quantity of CSI-RSs less than a largest quantity of CSI-RSs corresponding to a transmission scheme in the N transmission schemes, to obtain Z CSI-RS sequences in total, wherein in the Z CSI-RS sequences, a quantity of CSI-RSs of each of Z−1 CSI-RS sequences is equal to the largest quantity of CSI-RSs corresponding to the transmission scheme in the N transmission schemes, a quantity of CSI-RSs of one CSI-RS sequence is less than or equal to the largest quantity of CSI-RSs corresponding to the transmission scheme in the N transmission schemes, and Z is less than or equal to N;
respectively configuring Z mask sequences for the Z CSI-RS sequences;
and encoding, based on a mask in a corresponding mask sequence, each CSI-RS in the Z CSI-RS sequences.

10. The CSI-RS sending method according to claim 7, wherein the configuring a code group corresponding to a transmission scheme group comprises:
when the N transmission schemes correspond to the different quantities of CSI-RSs, determining whether a quantity of transmission schemes corresponding to the largest quantity of CSI-RSs is 1;
and when the quantity of transmission schemes corresponding to the largest quantity of CSI-RSs is 1, configuring a quantity of masks in each of the mask sequences to be a target quantity, wherein the target quantity is the largest quantity of CSI-RSs corresponding to the transmission scheme in the N transmission schemes, or a second largest quantity of CSI-RSs corresponding to a transmission scheme in the N transmission schemes;
or when the quantity of transmission schemes corresponding to the largest quantity of CSI-RSs is not 1, configuring a quantity of masks in each of the mask sequences to be the largest quantity of CSI-RSs.

11. The CSI-RS sending method according to claim 7, wherein after the configuring a code group, the method further comprises:
sending each group of masks to UE corresponding to a corresponding transmission scheme.

12. A channel state information-reference signal (CSI-RS) sending device, comprising modules configured to perform the CSI-RS sending method according to claim 1.

13. A base station, comprising a processor and a memory, wherein the memory is configured to store a program instruction;
and the processor is configured to invoke and execute the program instruction stored in the memory, so that the base station performs the CSI-RS sending method according to claim 1.

14. A non-transitory computer-readable storage medium, comprising an instruction, wherein when the instruction is run on a computer, the computer is enabled to perform the CSI-RS sending method according to claim 1.

* * * * *

UNITED STATES PATENT AND TRADEMARK OFFICE
CERTIFICATE OF CORRECTION

| | |
|---|---|
| PATENT NO. | : 11,483,115 B2 |
| APPLICATION NO. | : 17/127486 |
| DATED | : October 25, 2022 |
| INVENTOR(S) | : Luo et al. |

It is certified that error appears in the above-identified patent and that said Letters Patent is hereby corrected as shown below:

In the Claims

Claim 6: Column 22, Line 47: "sion schemes into in groups, wherein a quantity of" should read
-- sion schemes into m groups, wherein a quantity of --.

Claim 6: Column 22, Line 54: "greater than or equal to 1 and less than or equal to in," should read
-- greater than or equal to 1 and less than or equal to m, --.

Signed and Sealed this
Twenty-eighth Day of March, 2023

Katherine Kelly Vidal
*Director of the United States Patent and Trademark Office*